3,066,013
CYCLIC PROCESS FOR PRODUCING DIBORANE
Hugh E. Ramsden, Scotch Plains, N.J., assignor to Metal & Thermit Corporation, Woodbridge Township, N.J., a corporation of New Jersey
No Drawing. Filed July 17, 1958, Ser. No. 749,056
4 Claims. (Cl. 23—204)

The present invention is directed to a novel and efficient process for producing diborane.

Several methods for producing diborane are known. All are expensive. I have now discovered a novel, efficient, and economical method for producing diborane. The object of this invention is such production.

Generally speaking, the present invention contemplates a process for producing diborane ($B_2H_6$) by reacting alkyl borates with diaryltin dihydrides, preferably diphenyltin dihydride. The reaction products are diborane and the diphenyltin dialkoxide, which are easily separated.

The diaryltin dihydride utilized as a reactant may be recycled in the process. The regeneration process is exemplified for diphenyltin dihydride. Diphenyltin dimethoxide is hydrolyzed with acid to yield diphenyltin dichloride which is then reacted with sodium in liquid ammonia to yield diphenyltin disodium and sodium chloride. The diphenyltin disodium then is reacted to diphenyltin dihydride by ammonium chloride. A by-product of the aforementioned regeneration of diphenyltin dihydride from diphenyltin dimethoxide is methanol. Methanol may be used in the process to produce a methyl borate reactant, by reaction with boric acid in an acidic medium. Utilizing the aforedescribed process, the only reactants consumed are boric acid, sodium and hydrochloric acid, in the preparation of diborane. These materials are of course cheap. As in all processes involving the regeneration of materials in a cyclic manner, there are small losses of recycle materials. Make-up of a diphenyltin compound, probably diphenyltin dichloride, methanol and liquid ammonia to the system, in small amounts, would be necessary. The overall cost of these make-up materials would be small in comparison with the value of the product obtained, utilizing the aforementioned low-cost raw materials.

Generally the process is carried out by adding the boric acid ester in an inert solvent to the diphenyltin dihydride. The reaction sequence is not critical. The diborane, formed as a gas, is recovered in a refrigerated receiver.

The diaryltin dihydride and the alkylborate will react under normal conditions in the absence of a solvent, when the reactants utilized are liquids. Anhydrous conditions are maintained during the reaction. Generally the reaction is carried out in the presence of an inert solvent, preferably an aliphatic, cycloaliphatic or aromatic hydrocarbon, or an ether. These include hexane, pentane, octane, cyclohexane, toluene, diethyl ether, dioxane, tetrahydropyran, tetrahydrofuran, etc. The temperature utilized is dependent on the reactants and solvent utilized. It is generally below the system reflux temperature and must be below the decomposition temperature of the products, especially diborane. An inert atmosphere is generally employed. The reaction is usually carried out at normal pressure; pressure systems may be utilized with advantage dependent upon the reactants and solvent system specified.

The preferred boric acid esters utilized as the boron-containing reactant are generally alkyl borates which are most reactive. The short chain or lower alkyl borates which are cheaply prepared from such alcohols as methanol, ethanol, the commercially available mixed aryl alcohols, etc., by reaction with boric acid are preferred raw materials.

For the purpose of giving those skilled in the art a better understanding of the invention, the following illustrative example is given:

To 4 gram atoms (92 g.) of sodium dissolved in 3 liters of anhydrous liquid ammonia is slowly added one mole (343.7 g.) of diphenyltin dichloride dissolved in one liter of hexane. After completion of addition, the mixture is stirred for 3 hours and 2 moles (107.0 g.) of ammonium chloride is added portionwise. The mixture is then allowed to warm slowly up to 0 to 10° C., ammonia evaporating meanwhile. The hexane solution of diphenyltin dihydride is purged of ammonia by a current of dry nitrogen bubbled through. Then ⅔ mole (49.2 g.) of trimethyl borate dissolved in one liter of hexane is added dropwise, the gas stream being passed into a receiver cooled with liquid nitrogen to recover diborane as it is evolved.

The diphenyltin dimethoxide formed is reconverted with concentrated hydrochloric acid to methanol and diphenyltin dichloride for further recycle in the process.

Although the process has been illustrated using diphenyltin dihydride as the reducing agent, other powerful hydrocarbontin hydrides, and especially the aryltin hydrides are believed to be equivalents, as are equivalent boric acid esters, and are considered within the scope of the invention.

As many embodiments of this invention may be made without departing from the spirit and scope thereof, it is to be understood that the invention includes all such modifications and variations as come within the scope of the appended claims.

I claim:
1. A cyclic process for producing diborane which comprises reacting a lower trialkylborate with diphenyltin dihydride to yield diborane and a diphenyltin dialkoxide, acidifying said diphenyltin dialkoxide to form diphenyltin dichloride and alkyl alcohol, reacting said diphenyltin dichloride with sodium in liquid ammonia to yield diphenyltin disodium, and then reacting said diphenyltin disodium with ammonium chloride to regenerate diphenyltin dihydride.
2. The process of claim 1 in which the trialkyl borate is trimethyl borate.
3. The process of claim 1 in which the reaction is carried out in the presence of an inert solvent.
4. The process of claim 1 in which the alkyl alcohol produced by the acidification of the diphenyltin dialkoxide is utilized to produce the trialkyl borate reactant by reacting said alkyl alcohol with boric acid.

References Cited in the file of this patent

Schechter et al.: "Boron Hydrides and Related Compounds," prepared under Contract $NO_2$ (S) 10992 for Dept. of Navy, Bureau of Aeronautics, prepared by Callery Chemical Co., printed March 1951, declassified December 1953, pages 19–24.

Coates: "Organo-Metallic Compounds," 1956, pages 127–132.

Byrket et al.: "Chemical and Engineering News," vol. 22, pp. 1903–06 (1944).